(12) United States Patent
Luo (10) Patent No.: US 12,129,676 B2
(45) Date of Patent: Oct. 29, 2024

(54) UMBRELLA BASE FILLED WITH A COUNTERWEIGHT

(71) Applicant: Tempo Manufacturing LLC, Nantong (CN)

(72) Inventor: Xiong Luo, Nantong (CN)

(73) Assignee: Tempo Manufacturing LLC, Nantong (CN)

( * ) Notice: Subject to any disclaimer, the term of this patent is extended or adjusted under 35 U.S.C. 154(b) by 89 days.

(21) Appl. No.: 18/044,025

(22) PCT Filed: Oct. 16, 2020

(86) PCT No.: PCT/CN2020/121354
§ 371 (c)(1),
(2) Date: Mar. 3, 2023

(87) PCT Pub. No.: WO2022/052207
PCT Pub. Date: Mar. 17, 2022

(65) Prior Publication Data
US 2023/0313553 A1      Oct. 5, 2023

(30) Foreign Application Priority Data

Sep. 14, 2020   (CN) .......................... 202022009925.6

(51) Int. Cl.
*E04H 12/22*          (2006.01)
(52) U.S. Cl.
CPC ................ *E04H 12/2246* (2013.01)
(58) Field of Classification Search
CPC ............ E04H 12/2246; E04H 12/2253; E04H 12/2261; E04H 12/2269; E04H 12/2276; E04H 12/22; F16M 2200/08; F16M 11/28

USPC ........ 248/910, 511–541, 364.4, 123.2, 182.1
See application file for complete search history.

(56) References Cited

U.S. PATENT DOCUMENTS

| | | | | |
|---|---|---|---|---|
| 1,270,004 | A | * | 6/1918 | Chappell ................... A47F 7/08 248/910 |
| 3,119,588 | A | * | 1/1964 | Keats ...................... E01F 9/688 40/607.04 |
| 3,415,475 | A | * | 12/1968 | Goodman .............. F16M 11/22 248/910 |
| 4,145,044 | A | * | 3/1979 | Wilson ................. A63B 63/083 403/379.5 |

(Continued)

*Primary Examiner* — Christopher Garft
(74) *Attorney, Agent, or Firm* — Wang Law Firm, Inc.

(57) ABSTRACT

An umbrella base filled with a counterweight comprises an upper cover having a through hole in the center, a base plate, a sleeve, a ring and a counterweight; wherein, the upper cover is placed on top the base plate forming a chamber; the ring stands vertically inside the chamber separating the upper cover and the base plate; the sleeve has a tubular and receives an umbrella column, and is placed vertically on the center of the top surface of the upper cover and aligns with the ring; and a connecting piece is inserted through the base plate, the ring and the upper cover and connects to the sleeve. Or, the bottom of the sleeve passes through the upper cover and screws onto the ring. The umbrella base in the present invention is simple and reasonable in structure, stable and reliable in use, and low in cost, which can meet both usage and environmental protection requirements. It has an appearance not significantly different from that of parasol bases integrally molded by iron plates, and is worth popularizing.

8 Claims, 6 Drawing Sheets

(56) References Cited

U.S. PATENT DOCUMENTS

| | | | | |
|---|---|---|---|---|
| 4,311,294 | A * | 1/1982 | Hawley | G10G 5/00 |
| | | | | 248/188.7 |
| 4,901,971 | A * | 2/1990 | Connelly | A47G 33/12 |
| | | | | 248/225.11 |
| 4,913,388 | A * | 4/1990 | McCant | A63B 63/083 |
| | | | | 248/123.2 |
| 5,842,670 | A * | 12/1998 | Nigoghosian | A45D 20/12 |
| | | | | 248/910 |
| 6,189,458 | B1 * | 2/2001 | Rivera | B60R 11/00 |
| | | | | 108/150 |
| 11,946,271 | B2 * | 4/2024 | Shaffer | A45B 11/00 |
| 2004/0069922 | A1 * | 4/2004 | Wu | E04H 12/2246 |
| | | | | 248/519 |
| 2005/0189005 | A1 * | 9/2005 | Smith | G09F 23/00 |
| | | | | 135/16 |
| 2008/0237412 | A1 * | 10/2008 | Chinuki | F16M 11/28 |
| | | | | 248/123.2 |
| 2013/0153737 | A1 * | 6/2013 | Zoeteman | E04H 12/2238 |
| | | | | 248/513 |
| 2015/0322640 | A1 * | 11/2015 | Wu | E02D 27/38 |
| | | | | 405/203 |

* cited by examiner

UMBRELLA BASE FILLED WITH A COUNTERWEIGHT

TECHNICAL FIELD OF THE INVENTION

The present invention relates to the technical field of outdoor umbrellas, in particular to an umbrella base filled with a counterweight.

BACKGROUND OF THE INVENTION

As an outdoor leisure appliance, umbrellas are widely used in squares, beaches, parks, courtyards and other leisure places, providing a comfortable space for people to enjoy the cool.

Present umbrellas have various forms of umbrella bases made of different materials. To keep the balance with the fabric, the umbrella bases are bulky or heavy. At present, there are roughly two types of umbrella bases commonly used. The first type is integrally molded by materials with high self-weight, such as iron plates, marble and granite. The second type is a fillable hollow base provided with an umbrella column socket, and the entire base is integrally molded by plastic injection. When in use, the base is filled with material such as water or fine sand to balance its center of gravity, so that the base is more stable after the umbrella column is socketed therein. The defects of the above two types of umbrella bases are that the first type is costly in material and production, while the second type is bulky and therefore not easy to use.

After searching, a Chinese patent CN213756970U (patent No.: CN 202022009925.6) disclosed "an umbrella base easy for connecting the umbrella column" was found. The umbrella base comprises a hollow base, a connecting tube which is socketed in a socket at the center of the base, an umbrella column sleeve of a double-layer structure having an inner sleeve and an outer sleeve connecting to an end of the connecting tube, a plurality of channels are formed on a sidewall of the inner sleeve to form an elastic snap ring, threads are provided on an inner wall of the outer sleeve, and the connecting tube has a tapered surface fitted to the elastic snap ring of the umbrella column which can push the elastic snap ring to move close to an inner side of the sleeve and close up, so that the umbrella column is clamped. The umbrella base can close upon different sizes of umbrella columns, so as to prevent the umbrella column from shaking in the socket of the umbrella base to wear the wall of the socket, thus prolonging the service life of the umbrella base. However, the base is integral, bulky, and also complicated in structure, which will certainly make the manufacturing cumbersome, not only reflected in complicated molds, but also in an increase of the manufacturing cost.

SUMMARY OF THE INVENTION

It is an object of the present invention to provide an umbrella base filled with a counterweight which is simple and reasonable in structure, low in cost, and easy to use.

For achieving the above object, the umbrella base filled with a counterweight comprises an upper cover having a through hole in the center, a base plate, a sleeve, a ring and a counterweight between the upper cover and the base plate; wherein, the upper cover is placed on top the base plate forming a chamber between the upper cover and the base plate for receiving the counterweight, the upper cover has a top surface with a center; the ring stands vertically inside the chamber separating the upper cover and the base plate, and the ring aligns with the through hole on the upper cover; the sleeve has a tubular and receives an umbrella column, and is placed vertically on the center of the top surface of the upper cover and aligns with the ring; and a connecting piece is inserted through the base plate, the ring and the upper cover and connects to the sleeve.

Or, for achieving the above object, the umbrella base filled with a counterweight comprising an upper cover having a through hole in the center, a base plate for receiving the counterweight, a sleeve having a bottom, and a ring between the upper cover and the base plate; wherein, the upper cover is covered on the base plate forming a chamber between the upper cover and the base plate for receiving the counterweight; the ring stands vertically inside the chamber supporting the upper cover and the base plate, and the ring locates corresponding to the through hole of the upper cover; the sleeve is tubular for receiving an umbrella column, and is vertically disposed on the center of the top surface of the upper cover and coaxial with the ring; the bottom of the sleeve passes through the upper cover and screws onto the ring.

Preferably, the upper cover has a downward flange; the counterweight with a center hole is placed in the chamber between the periphery of the ring and the flange of the upper cover.

Preferably, the ring is connected to the upper cover at the center thereof facing to the through hole by welding or bonding, and the height of the ring is adapted to the flange.

Preferably, the base plate is connected to the flange, and is respectively connected to the flange and the ring by welding or bonding.

Preferably, the base plate has a center hole, the sleeve has a threaded hole at the bottom thereof, and the connecting piece is a long screw adapted to the threaded hole which runs through the base plate, the ring, the upper cover and is connected to the sleeve.

Preferably, the sleeve has a male threaded linkage section at the bottom thereof, and the ring with a top and a bottom has a female threaded hole corresponding to the male threaded linkage section; the diameter of the through hole of the upper cover is not smaller than that of the top of the ring, the ring is fixed between the upper cover and the base plate with the top of the ring coming out from the through hole, the bottom of the sleeve is screwed inside the ring.

Preferably, the counterweight is formed by iron sand or quartz as an filling material; a plurality of magnetic elements are embedded in the upper cover, so that an iron plate is capable of directly being adsorbed onto the upper cover to increase the weight of the umbrella base.

Preferably, the sleeve has a square cross section, and comprises a movable tube and a fixed tube which can be sleeved; the bottom of the movable tube is slidably sleeved in the fixed tube and is positioned by a positioning mechanism.

Preferably, a connecting component for connecting the umbrella column is sleeved on the top of the movable tube, the connecting component has a receiving hole for receiving the umbrella column; the connecting piece has a female threaded hole communicating with the receiving hole formed at the side of the connecting component, a knob is disposed at the side of the connecting component, the knob has a screw stem which screwed inside the female threaded hole being connected to the connecting component; the receiving hole has two right-angled sides located at the position in the diagonal direction of the female threaded hole; after the umbrella column is inserted inside the receiving hole of the connecting component, the screw of the knob is pressed against the umbrella column by rotating the knob, so that the umbrella column resists against the two right-angled sides of the connecting component in the receiving hole.

Compared with the prior art, the present invention has the following advantages. The umbrella base comprises the sleeve, the upper cover, the base and the ring, and has an appearance not significantly different from that of umbrella bases integrally molded by iron plates, and iron sand, quartz and other cheap material can be filled in the umbrella base to serve as a counterweight with enough heavy, thus greatly reducing the cost. The magnetic elements are placed on the upper cover, so that the iron plate can be directly adsorbed onto the upper cover to increase the weight of the umbrella base. The umbrella base is retractable to facilitate length adjustment and therefore can be flexibly applied to various scenarios. The sleeve and the stem are connected more stably and effectively. The umbrella base in the present invention is simple and reasonable in structure, stable and reliable in use, and low in cost, which can meet both usage and environmental protection requirements. It has an appearance not significantly different from that of parasol bases integrally molded by iron plates, and is worth popularizing.

DETAILED DESCRIPTION OF THE INVENTION

The present invention will be further described in detail by embodiments with reference to the accompanying drawings.

Embodiment 1

As shown in FIGS. 1, 2, 5-13, an umbrella base filled with a counterweight comprises an upper cover 1 having a through hole 12 in the center, a base plate 2, a sleeve 3, a ring 4 and a counterweight 5; the upper cover 1 is covered on the base plate 2 forming a chamber, usually a closed chamber, between the upper cover 1 and the base plate 2 for receiving the counterweight; of course, the chamber may also be an opening sealed with a plug; the ring 4 stands vertically inside the chamber separating the upper cover 1 and the base plate 2, and the ring 4 aligns with the through hole 12 on the upper cover 1; the sleeve 3 has a tubular and receives an umbrella column 9, and is placed vertically on the center of the top surface of the upper cover 1 and aligns with the ring 4; and a connecting piece 6 is inserted through the base plate 2, the ring 4 and the upper cover 1 and connects to the sleeve 3.

Figure 1:
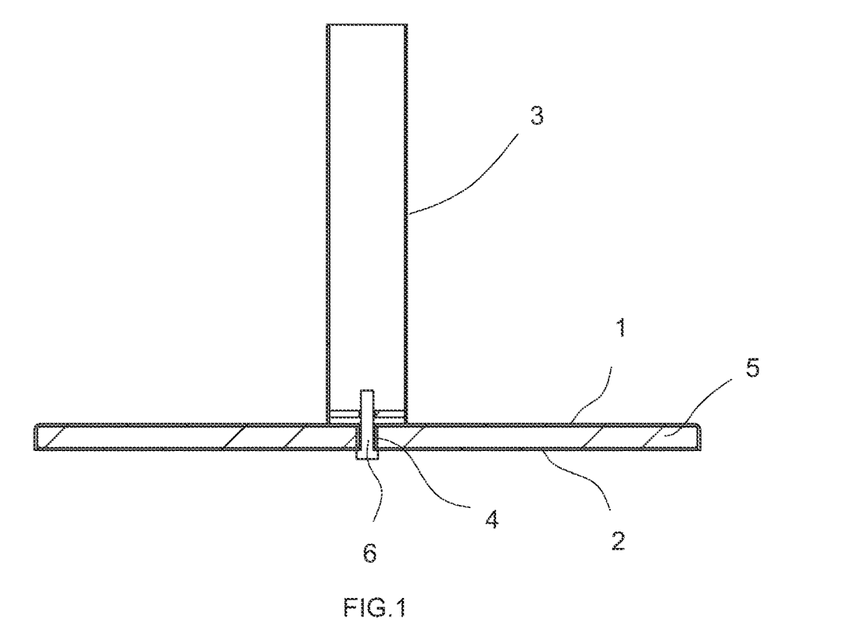
FIG. 1 is a perspective view of an umbrella base filled with a counterweight according to the Embodiment 1 of the present invention.
Figure 2:
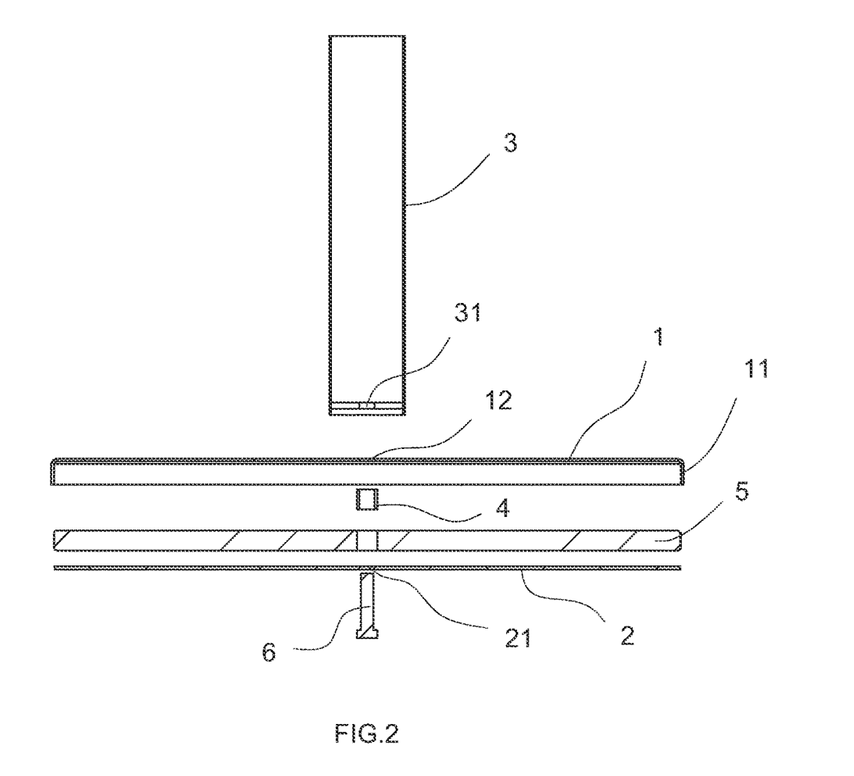
FIG. 2 is an exploded view of FIG. 1.

The specific structure is as follows: the upper cover 1 has a downward flange 11; the ring 4 is connected to the upper cover 1 at the center thereof facing to the through hole 12 by welding or bonding, and the height of the ring 4 is adapted to the flange 11; the counterweight 5 with a center hole is placed in the chamber between the periphery of the ring 4 and the flange 11 of the upper cover 1; the counterweight 5 is formed by cheap material such as iron sand or quartz as an filling material; the base plate 2 is connected to the flange 11, and is respectively connected to the flange 11 and the ring 4 by welding or bonding.

The upper cover 1 has a through hole 12 in the center; the base plate 2 has a center hole 21, the sleeve 3 has a threaded hole 31 at the bottom thereof, and the connecting piece is a long screw 6 adapted to the threaded hole 31 which runs through the base plate 2, the ring 4, the upper cover 1 and is connected to the sleeve 3.

Figure 5:
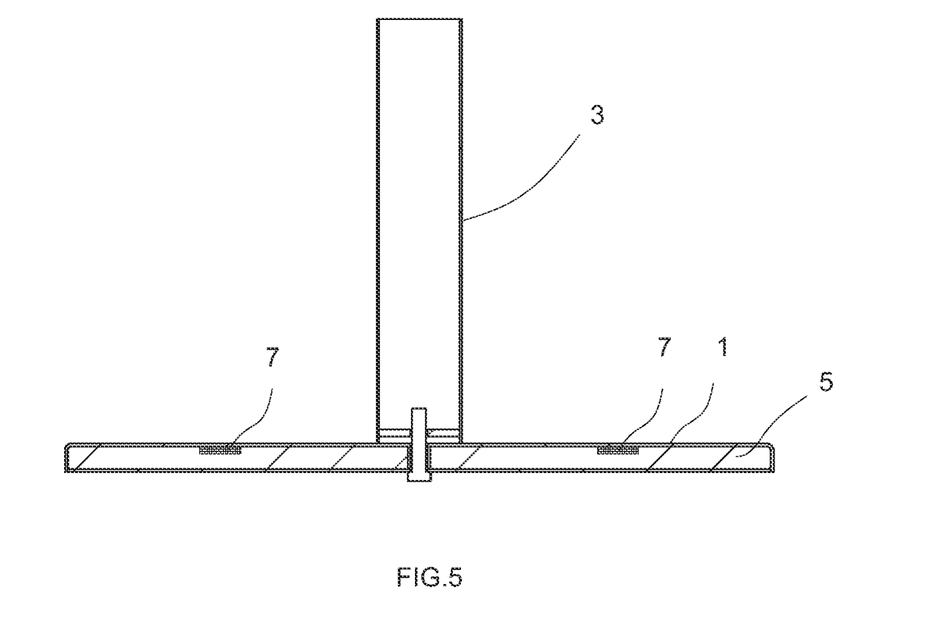
FIG. 5 is a perspective view of the umbrella base when magnetic elements are additionally placed on an upper cover of FIG. 1.
Figure 6:
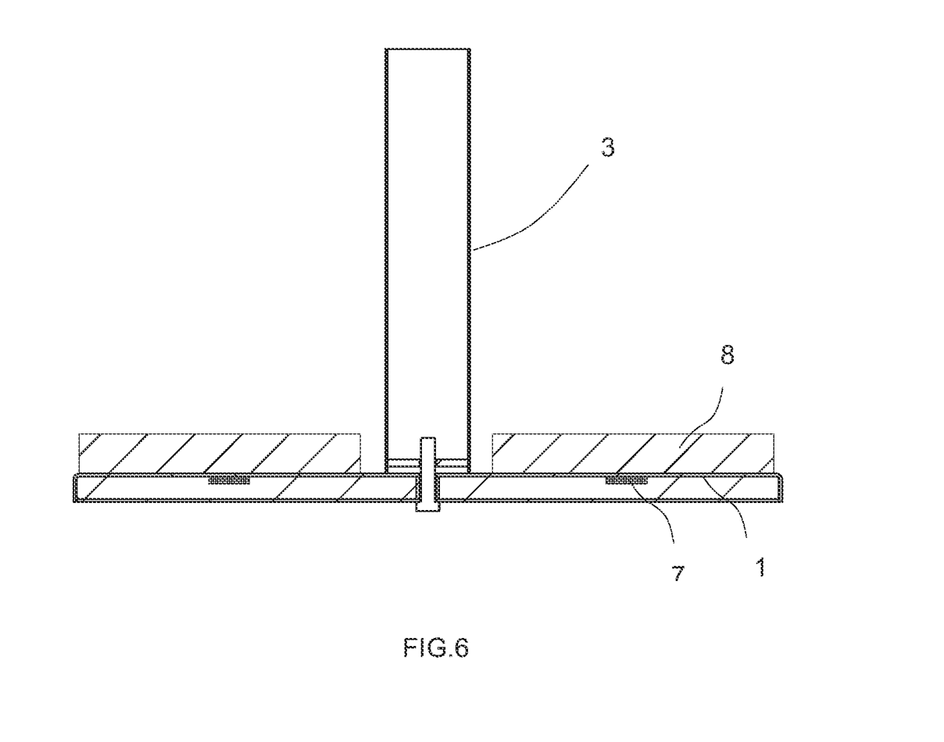
FIG. 6 is a perspective view of the umbrella base when the iron plate are adsorbed onto the upper cover of FIG. 5.

A plurality of magnetic elements 7 are embedded in the upper cover 1, so that an iron plate 8 is capable of directly being adsorbed onto the upper cover 1 to increase the weight of the umbrella base and the umbrella base can be freely placed in various forms, no need to use screws or other elements to make the umbrella base be fixed.

Figure 7:
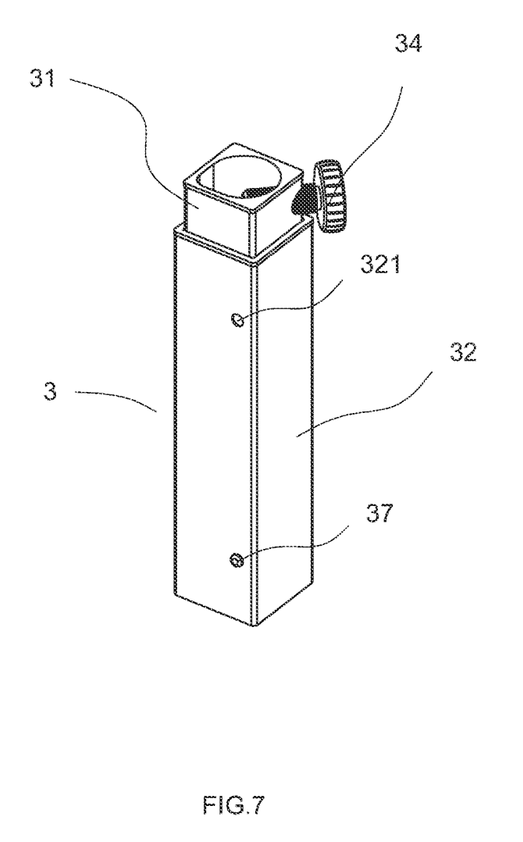
FIG. 7 is a perspective view of the sleeve when it is retracted.
Figure 8:
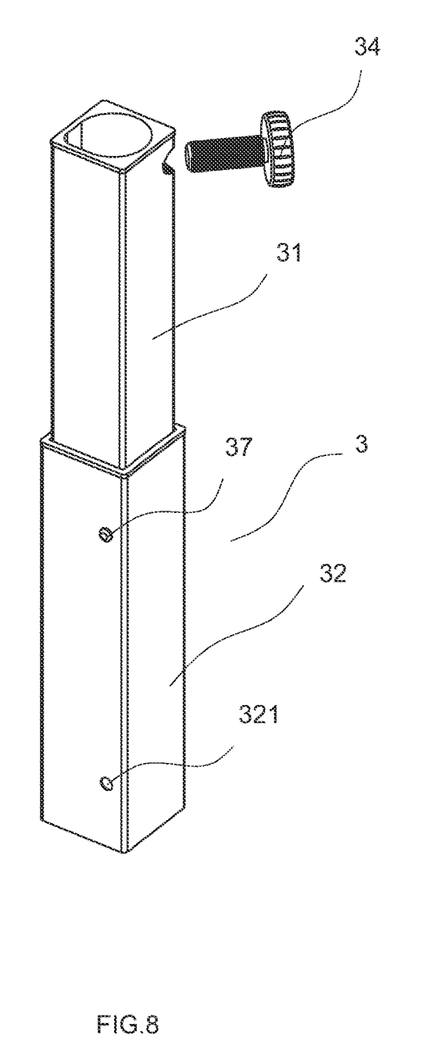
FIG. 8 is a perspective view of the sleeve when it is stretched.
Figure 9:
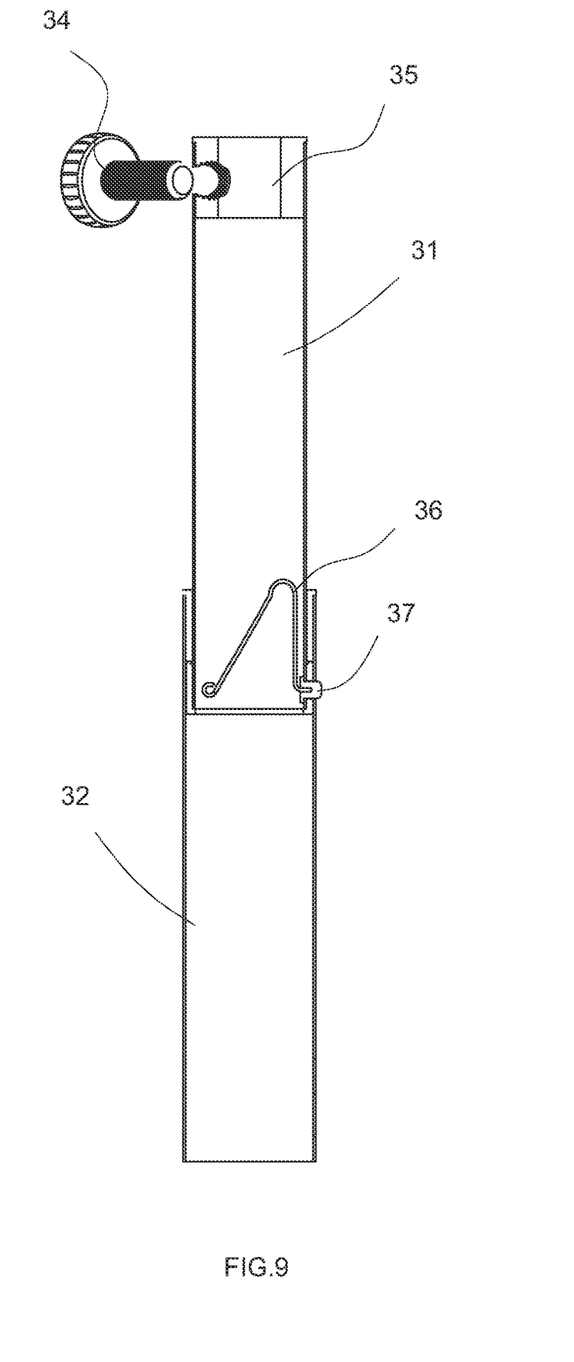
FIG. 9 is a sectional view of FIG. 8.
Figure 10:
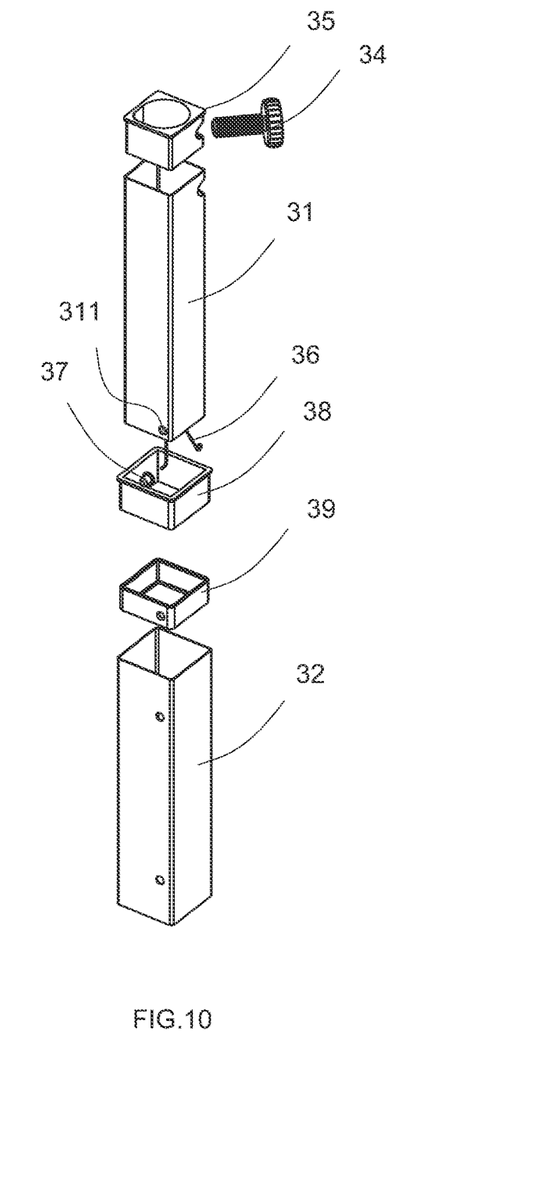
FIG. 10 is an exploded view of the sleeve.

In this embodiment, as shown in FIGS. 7 to 8, the sleeve 3 has a square cross section, and comprises a movable tube 31 and a fixed tube 32 which can be sleeved; the bottom of the movable tube 31 is slidably sleeved in the fixed tube 32 and is positioned by a positioning mechanism which may be a snap 37 or a screw, and the snap 37 is a spring pin or other similar elements; a protective socket 38 is placed at a head end of the fixed tube 32, and two alignment holes 321 are placed on a side of the fixed tube 32, and a fixed hole 311 for the snap 37 to pass through is correspondingly provided on a lower portion of the movable tube 31. A slidable socket 39 is provided at a tail end of the movable tube 31, and the movable tube 31 can slide in the fixed tube 32 with the aid of the protective socket 38 and the slidable socket 39. An elastic element 36, such as an elastic piece, is provided in the movable tube 31 and presses the snap 37 into the fixed hole 311 on the movable tube 31. At the same time, the snap 37 also passes through a hole on the slidable socket 39 and finally through any one of the two alignment holes 321 of the fixed tube 32. When in use, the snap 37 is pressed to pop out of the alignment hole 321 on the fixed tube 32. In this case, the movable tube 31 can slide freely. When the movable tube slides to the highest or lowest point, the snap 37 pops out into the other alignment hole 321 on the fixed tube 32 under the pressure of the elastic member 36. In this case, the movable tube 31 is fixed in the fixed tube 32.

Figure 11:
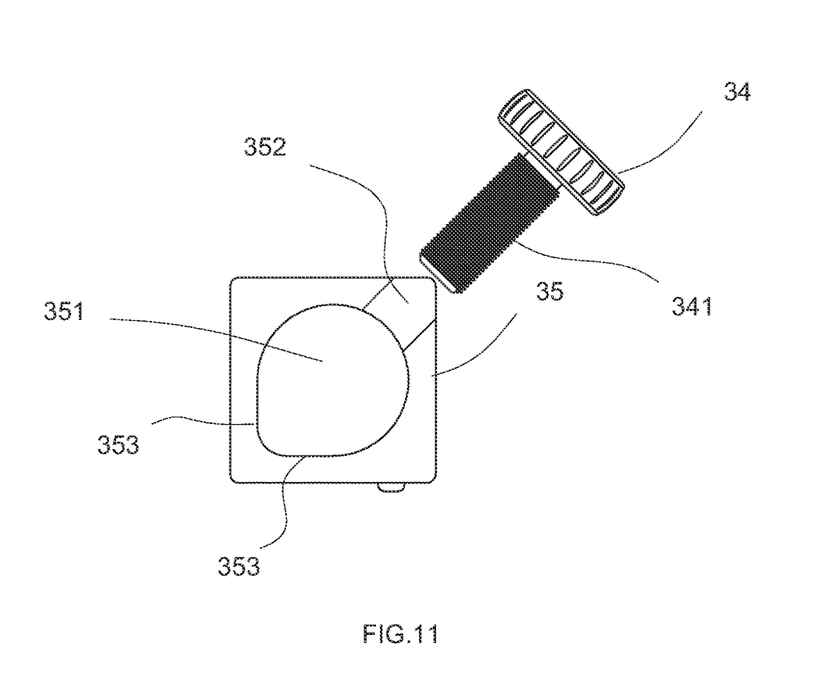
FIG. 11 is a perspective view of the connecting piece and the knob.
Figures 12, 13:
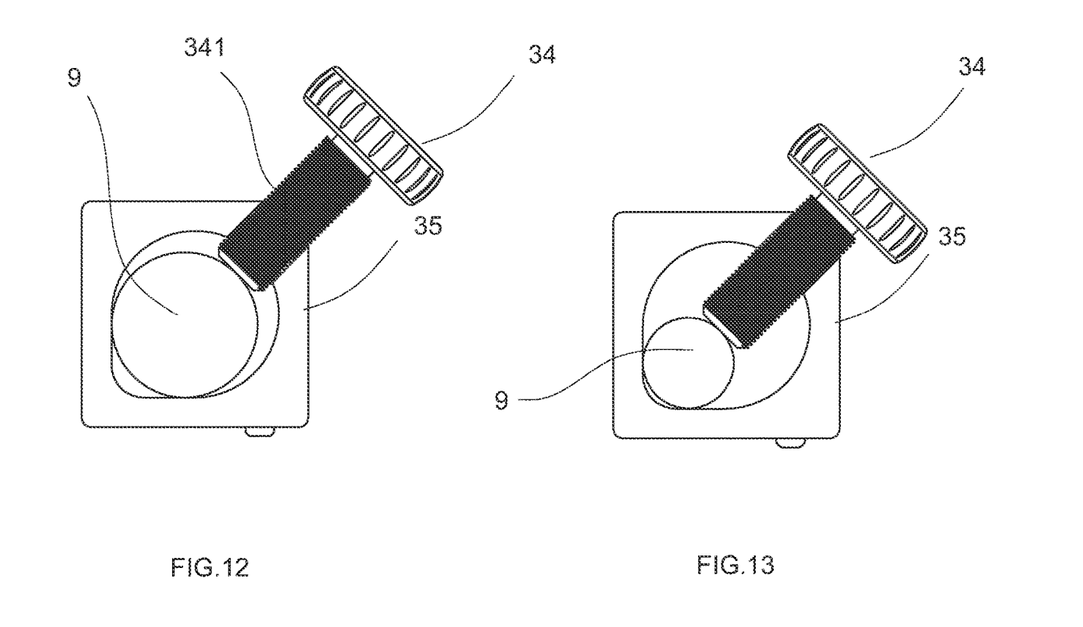
FIG. 12 is a perspective view when the umbrella column of different diameters are inserted in and connected to the connecting piece.
FIG. 13 is a perspective view when the umbrella column of different diameters are inserted in and connected to the connecting piece.

A connecting component 35 for connecting the umbrella column 9 is sleeved on the top of the movable tube 31, the connecting component 35 has a receiving hole 351 for receiving the umbrella column 9; the connecting piece 35 has a female threaded hole 352 communicating with the receiving hole 351 formed at the side of the connecting component 35, a knob 34 is disposed at the side of the connecting component 35, the knob 34 has a screw stem 341 which is screwed inside the female threaded hole 352 being connected to the connecting component 35; the receiving hole 351 has two right-angled sides 353 located at the position in the diagonal direction of the female threaded hole 352; the two right-angled sides 353 and the screw 341 of the knob 34 are axial symmetry; after the umbrella column 9 is inserted inside the receiving hole 351 of the connecting component 35, the screw 341 of the knob 34 is pressed against the umbrella column 9 by rotating the knob 34, so that the umbrella column 9 resists against the two right-angled sides 353 of the connecting component 35 in the receiving hole 351, thus forming three contact points to secure the umbrella column 9 more stable in the sleeve 3, as shown in FIGS. 12 to 13.

When in use, the sleeve 3 is fixed on the upper cover 1 through the long screw 6, the umbrella column 9 is socketed in the connecting piece 35, and the screw 341 of the knob 34 is pressed against the umbrella column 9 by rotating the knob 34. In this case, regardless of the size of the umbrella column 9, the umbrella column 9 will come to be in contact with the two right-angled sides 353 in the connecting piece 35 under the pressure of the knob 34, thus forming three contact points to secure the umbrella column 9 more stable in the sleeve 3.

The ring 4 and the upper cover 1 not only can be connected by welding, but also can be secured in other ways. The base plate 2 and the flange 11 of the upper cover 1 not only can be connected by welding, but also can be secured in other ways, such as by screws.

Embodiment 2

Figure 3:
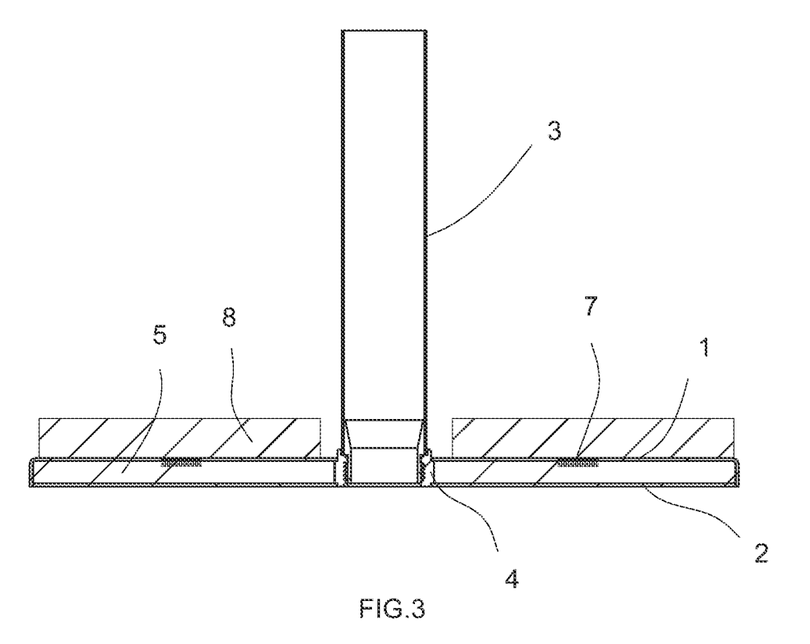
FIG. 3 is a perspective view of an umbrella base filled with a counterweight according to Embodiment 2 of the present invention.
Figure 4:
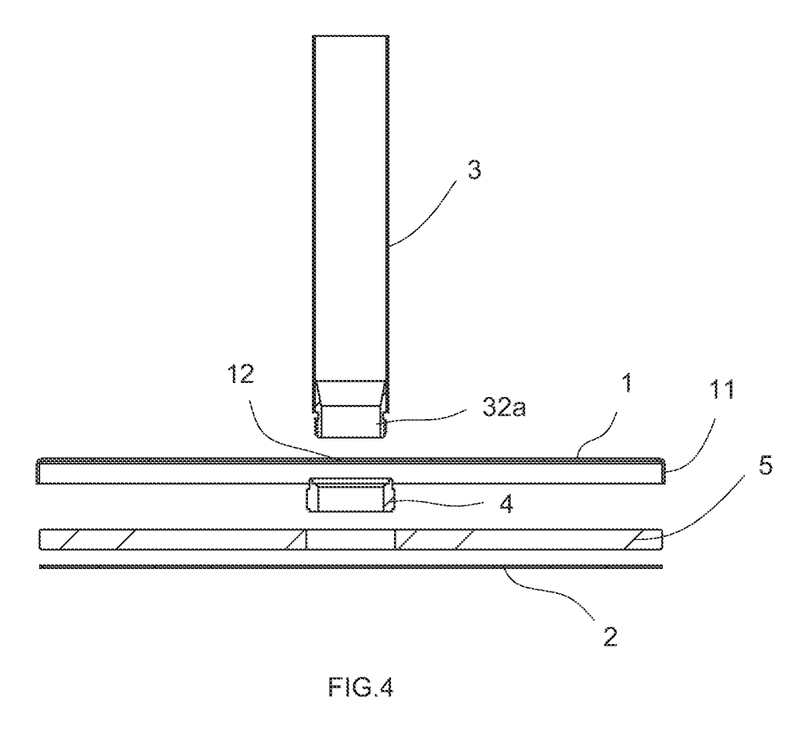
FIG. 4 is an exploded view of the umbrella base without any iron plate adsorbed according to Embodiment 2 of the present invention.

As shown in FIGS. 3 and 4, the umbrella base filled with a counterweight of Embodiment 2 comprises an upper cover 1 having a through hole 12 in the center, a base plate 2, a sleeve 3, a ring 4 and a counterweight 5; the upper cover 1 is covered on the base plate 2 forming a chamber, usually a closed chamber, between the upper cover 1 and the base plate 2 for receiving the counterweight; of course, the chamber may also be an opening sealed with a plug; the ring 4 stands vertically inside the chamber supporting the upper cover 1 and the base plate 2; the sleeve 3 is tubular for receiving an umbrella column, and is vertically disposed on the center of the top surface of the upper cover 1 and coaxial with the ring 4; the bottom of the sleeve 3 passes through the upper cover 1 and screws onto the ring 4.

The specific structure is as follows: the upper cover 1 has a downward flange 11; the ring 4 is connected to the upper cover 1 at the center thereof facing to the through hole 12 by welding or bonding, and the height of the ring 4 is adapted to the flange 11; the counterweight 5 with a center hole is placed in the chamber between the periphery of the ring 4 and the flange 11 of the upper cover 1; the counterweight 5 is formed by cheap material such as iron sand or quartz as an filling material; the base plate 2 is connected to the flange 11, and is respectively connected to the flange 11 and the ring 4 by welding or bonding; the sleeve 3 has a male threaded linkage section 32a at the bottom thereof; the ring 4 is a large-diameter ring fitted to the sleeve 3; the ring 4 with a top and a bottom has a female threaded hole 31 corresponding to the male threaded linkage section 32a; the diameter of the through hole 12 of the upper cover 1 is not smaller than that of the top of the ring 4, the ring 4 is fixed between the upper cover 1 and the base plate 2 with the top of the ring 4 coming out from the through hole 12, the bottom of the sleeve 3 is screwed inside the ring 4.

Similar to Embodiment 1, a plurality of magnetic elements 7 are embedded in the upper cover 1, so that an iron plate 8 is capable of directly being adsorbed onto the upper cover 1 to increase the weight of the umbrella base and the umbrella base can be freely placed in various forms, no need to use screws or other elements to make the umbrella base be fixed.

The structure of the sleeve 3 and the positioning mechanism of the umbrella column 9 and the sleeve 3 are the same as those in Embodiment 1 and therefore will not be repeated herein.

The ring 4 and the upper cover 1 not only can be connected by welding, but also can be secured in other ways. The base plate 2 and the flange 11 of the upper cover 1 not only can be connected by welding, but also can be secured in other ways, such as by screws.

The protection scope of the present invention is not limited to each embodiment described in this description. Any changes and replacements made on the basis of the scope of the present invention and of the description shall be included in the scope of the patent.

The invention claimed is:

1. An umbrella base filled with a counterweight comprising an upper cover having a through hole in the center, a base plate, a sleeve, a ring and the counterweight between the upper cover and the base plate;
   wherein,
   the upper cover is placed on top the base plate forming a chamber between the upper cover and the base plate for receiving the counterweight, the upper cover has a top surface with a center;
   the ring stands vertically inside the chamber separating the upper cover and the base plate, and the ring aligns with the through hole on the upper cover;
   the sleeve has a tubular and a square cross section and receives an umbrella column, and comprises a movable tube and a fixed tube which can be sleeved and is placed vertically on the center of the top surface of the upper cover and aligns with the ring;
   a connecting piece is inserted through the base plate, the ring and the upper cover and connects to the sleeve;
   a bottom of the movable tube is slidably sleeved in the fixed tube and is positioned by a positioning mechanism;
   a connecting component for connecting the umbrella column is sleeved on a top of the movable tube, the connecting component has a receiving hole for receiving the umbrella column;
   the connecting piece has a female threaded hole communicating with the receiving hole formed at the side of the connecting component, a knob is disposed at the side of the connecting component, the knob has a screw stem which is screwed inside the female threaded hole connected to the connecting component;
   the receiving hole has two right-angled sides located at the position in the diagonal direction of the female threaded hole;
   after the umbrella column is inserted inside the receiving hole of the connecting component, the screw of the knob is pressed against the umbrella column by rotating the knob, so that the umbrella column resists against the two right-angled sides of the connecting component in the receiving hole.

2. An umbrella base filled with a counterweight comprising an upper cover having a through hole in the center, a base plate, a sleeve having a bottom, and a ring between the upper cover and the base plate;

wherein, the upper cover is covered on the base plate forming a chamber between the upper cover and the base plate;

the ring stands vertically inside the chamber supporting the upper cover and the base plate, and the ring locates corresponding to the through hole of the upper cover;

the sleeve comprises a movable tube and a fixed tube and has a square cross section for receiving an umbrella column, and is vertically disposed on the center of the top surface of the upper cover and coaxial with the ring;

a bottom of the movable tube is slidably sleeved in the fixed tube and passes through the upper cover and screws onto the ring;

a connecting component for connecting the umbrella column is sleeved on a top of the movable tube, the connecting component has a receiving hole for receiving the umbrella column;

the connecting piece has a female threaded hole communicating with the receiving hole formed at the side of the connecting component, a knob is disposed at the side of the connecting component, the knob has a screw stem which is screwed inside the female threaded hole connected to the connecting component;

the receiving hole has two right-angled sides located at the position in the diagonal direction of the female threaded hole;

after the umbrella column is inserted inside the receiving hole of the connecting component, the screw of the knob is pressed against the umbrella column by rotating the knob, so that the umbrella column resists against the two right-angled sides of the connecting component in the receiving hole.

3. The umbrella base of claim 1, wherein the upper cover has a downward flange, the counterweight with a center hole is placed in the chamber between the periphery of the ring and the flange of the upper cover.

4. The umbrella base of claim 3, wherein the ring is connected to the upper cover at the center thereof facing to the through hole by welding or bonding, and the height of the ring is adapted to the flange.

5. The umbrella base of claim 4, wherein the base plate is connected to the flange, and is respectively connected to the flange and the ring by welding or bonding.

6. The umbrella base of claim 1, wherein the base plate has a center hole, the sleeve has a threaded hole at the bottom thereof, and the connecting piece is a long screw adapted to the threaded hole which runs through the base plate, the ring, the upper cover and is connected to the sleeve.

7. The umbrella base of claim 2, wherein the sleeve has a male threaded linkage section at the bottom thereof, and the ring with a top and a bottom has a female threaded hole corresponding to the male threaded linkage section;

the diameter of the through hole of the upper cover is not smaller than that of the top of the ring, the ring is fixed between the upper cover and the base plate with the top of the ring coming out from the through hole, the bottom of the sleeve is screwed inside the ring.

8. The umbrella base of claim 1, wherein the counterweight is formed by iron sand or quartz as a filling material;

a plurality of magnetic elements are embedded in the upper cover, so that an iron plate is capable of directly being adsorbed onto the upper cover to increase the weight of the umbrella base.

* * * * *